ns Patent [19]

Kitta et al.

[11] 3,922,437
[45] Nov. 25, 1975

[54] STEEL MATERIAL FOR USE IN THE PRESTRESSED CONCRETE

[75] Inventors: Toshiyuki Kitta, Morioka; Shohiko Miyata, Tokyo; Tatsumi Fukunaga, Tokyo; Mataichi Kasahara, Tokyo, all of Japan

[73] Assignees: Japanese National Railways; Oiles Kogyo Kabushiki Kaisha, both of Tokyo, Japan

[22] Filed: Oct. 12, 1973

[21] Appl. No.: 405,756

[30] Foreign Application Priority Data
Oct. 19, 1972  Japan............................ 47-103950

[52] U.S. Cl. ................ 428/383; 57/149; 264/228; 427/409; 428/467
[51] Int. Cl.² ...................... D07B 1/16; B32B 15/08
[58] Field of Search ........... 57/149; 52/230; 117/75, 117/132 C, 128.4, 92, 135; 161/175; 264/228; 428/383, 380; 427/409; 156/244

[56] References Cited
UNITED STATES PATENTS

| 2,561,487 | 7/1951 | Bailhe............................ 117/75 X |
| 3,084,066 | 4/1963 | Dunmire............................ 117/75 |
| 3,443,982 | 5/1969 | Kjellmark.................... 117/128.4 X |
| 3,646,748 | 3/1972 | Lang............................. 117/75 X |
| 3,661,622 | 5/1972 | Rogers........................... 117/75 |

FOREIGN PATENTS OR APPLICATIONS 1,237,591  6/1971  United Kingdom................. 260/28

Primary Examiner—Ralph Husack
Attorney, Agent, or Firm—Oldham & Oldham Co.

[57] ABSTRACT

Steel material for use in prestressed concrete comprises the PC-steel rod or wire, a coating layer of the lubricant containing thermoplastic material and a thin layer of the lubricant as the intermediate layer.

The said intermediate layer is automatically formed on the surface of the PC-steel material or on the surface of an inner plastic resin layer precoated on the PC-steel material during coating the PC-steel material with the said lubricant-containing thermoplastic material and a method for making the said steel material is disclosed.

20 Claims, No Drawings

STEEL MATERIAL FOR USE IN THE PRESTRESSED CONCRETE

BACKGROUND OF THE INVENTION

1. Field of the Invention

This invention relates to the steel material for use in prestressed concrete (so-called PC-steel) coated with the lubricant-containing thermoplastic material on the surface of the PC-steel and the method for manufacturing the same. The present invention is principally based upon the discovery of the fact that a very thin layer of the lubricant is formed automatically between the PC-steel and the lubricant-containing thermoplastic material, when the PC-steel is coated with the lubricant-containing thermoplastic material. An object of the present invention is to provide the PC-steel with a material comprising the very thin layer of the lubricant between the PC-steel(or the inner plastic resin layer precoated on the surface of the PC-steel) and the lubricant containing thermoplastic material layer.

Another object of the present invention is to provide PC-steel material having improved anitcorrosion property. Further object of the present invention is to provide a PC-steel material having the property of decreasing the friction force between the PC-steel material and an other article, for example, a sheath.

Still a further object of the present invention is to provide the PC-steel material exhibiting effect(s) of the sheath for sliding between the PC-steel and the coating layer of the lubricant-containing thermoplastic material when the said PC-steel, buried into the concrete structure, is stretched.

2. Description of Prior Art

In the prior art, cracks have been observed in the concrete structure using the prior PC-steel thereby permitting an invasion of rain-water and cavities between the grout material and the PC-steel resulting from inadequate grouting thereby causing corrosion of the stretched PC-steel when the concrete structure is used in the sea.

In the post-tension method for manufacturing the concrete structure using the PC-steel, the tensile strength of the PC-steel has to be applied against the friction resistance produced by contact between the PC-steel and an inner-wall surface of the sheath material thereby injuring the surface of the PC-steel and bringing the corrosion of the PC-steel and finally breaking off the PC-steel.

To overcome the said disadvantages, in the prior art, the steel materials, coated with the plastic material, have been manufactured by coating the twisted steel wire rope with the lubricant, winding a paper strip around the said steel wire rope and then coating it with the plastic sheet or film. However, said process is rather complicated.

In the said process, if the plastic coating is effected at a high temperature and under the high pressure according to the extrusion molding method, it brings out several questions, one of which is that the lubricant pre-coated on the surface of the twisted steel wire rope is exuded through the wound paper layer thereby making it difficult to produce the steel material uniformly coated with the plastic material, and another of which is that the plastic material to be coated is deeply forced into the uneven surface of the twisted steel wire rope through the wound paper layer whereby the surface of said coated plastic material will become uneven analogous to that of the surface of the twisted steel wire rope, unless the said twisted steel wire ropes are thickly wound with the paper strip or the plastic material.

SUMMARY OF THE INVENTION

1. This invention relates to the steel material, especially the PC-steel material for use in the prestressed concrete structure comprising the PC-steel, the layer of the lubricant-containing oleophobic thermoplastic material and the very thin layer of the lubricant which is automatically formed from about a few microns to 10 microns in thickness between the said lubricant containing thermoplastic material and the PC-steel during coating the PC-steel with the said lubricant-containing thermoplastic material, and also a method for manufacturing the same.

2. This invention relates to the PC-steel materials comprising the PC-steel, the layer of the lubricant-containing oleophilic thermoplastic material containing the lubricant and the very thin layer of the lubricant automatically formed as the intermediate layer therebetween and the method for manufacturing the same.

3. This invention relates to the PC-steel materials comprising the PC-steel, the inner resin material layer pre-coated on the surface of the PC-steel, the outer layer of the lubricant-containing thermoplastic material and the very thin intermediate layer of the lubricant which is automatically formed between the layer of the said lubricant-containing thermoplastic material and the layer of the resin material precoated on the surface of the PC-steel during double coating of the said resin material layer with the said lubricant containing thermoplastic material and the method for manufacturing the same.

4. This invention relates to the PC-steel material comprising the PC-steel, the inner layer of the lubricant-containing thermoplastic material pre-coated on the surface of the PC-steel, the outer layer of the oleophobic or oleophilic thermoplastic material and the very thin intermediate layer of the lubricant automatically formed between the said inner layer of the lubricant-containing thermoplastic material and the said PC-steel and the method for manufacturing the same.

DESCRIPTION OF THE PREFERRED EMBODIMENT

The oleophilic thermoplastic material used in this invention comprises polyolefins such as high density polyethylene, polypropylene, polybutene and a copolymer thereof.

The oleophobic thermoplastic material used in this invention comprises polyacetal, polyamide, polyvinyl chloride, polyvinylidene chloride, polyvinylacetate, polyacrylonitrile and copolymers thereof. The lubricant used is a hydrocarbon lubricating oil or wax.

The oleophobic thermoplastic material possesses the properties of not absorbing the lubricant, of being insoluble in the lubricant and of not swelling in the lubricant.

When the oleophilic or oleophobic thermoplastic material is used as the outer coating layer of the lubricant-containing thermoplastic material, the said oleophilic or oleophobic thermoplastic material used as the outer layer possesses a lower melting point than that of the lubricant containing thermoplastic material.

The resin material precoated on the surface of the PC-steel is an oleophobic thermoplastic or thermosetting material having properties of not melting into the said lubricant-containing thermoplastic material to be coated on the surface of the said resin material and not adhering to the said lubricant-containing thermoplastic material and selected from polyvinyl-chloride, polyvinylidene chloride, polyvinyl alcohol, polyacetal, polyamide and a thermosetting resin material such as phenolic resin.

If polyacetal is used as the lubricant-containing thermoplastic material, the said resin material may be polyamide. If polyacetal is used as the lubricant-containing thermoplastic material, phenolic resin may be used as the said resin material to be precoated on the surface of the PC-steel.

The PC-steel used in this invention comprises the PC-steel wire and the PC-steel rod.

The methods for manufacturing the lubricant-containing thermo-plastic material used in this invention are shown as follows:

1. When polyethylene is used as the oleophilic thermoplastic material. The molding material of polyethylene pellets is heated and mixed with 3–15 wt% of the said lubricant to uniformly mix the lubricant with the pellets thereby obtaining non-sticky pellets of the molding material containing the lubricant.

2. When polyacetal or polyamide is used as the oleophobic thermoplastic material.
   i. According to one of the said methods, the molding material of polyacetal or polyamide powder is mixed with an excess amount of the lubricant, heated to a temperature not lower than the melting point of the said plastic material and allowed to stand and cool, whereby the melted thermoplastic material is settled into the lubricant and solidified. The solid mass is milled to obtain a desired molding material. (This method is disclosed in the specification of British Pat. No. 1237591 that also discloses use of a hydrocarbon oil or wax as the lubricating material.) Of course, the excess amount of lubricant is a hydro-carbon lubricating oil or wax.
   ii. According to another method, polyacetal or polyamide powder is mixed with a predetermined amount of the lubricant to form a uniform coating of the lubricant on the said powder, and melt, knead, extrude the coated powder, thereby substantially uniformly dispersing the lubricant into the said powder as the discrete particles.

Thus the desired lubricant-containing material is obtained. (This method is disclosed in the said patent specification.) The method of coating the PC-steel with the said lubricant-containing thermoplastic material is explained as follows:

a. The coating of the PC-steel with the said lubricant-containing thermoplastic material is effect by means of an extrusion molding machine provided with a cross-head die.

Namely, the said lubricant-containing thermoplastic material is supplied to the heating cylinder of the extrusion molding machine controlled at the predetemined temperature gradients.

While the PC-steel is fed to the cross-head die provided at the head of the said heating cylinder to coat the PC-steel with the said lubricant-containing thermoplastic material whereby a very thin hydrocarbon lubricating oil or wax layer is automatically formed between the surface of the PC-steel and the lubricant-containing thermoplastic coating layer and the lubricant is uniformly dispersed in the oleophobic thermoplastic material as discrete fine particles.

b. The said coating may be similarly effected by using the PC-steel rod or wire pre-coated with the resin material thereby automatically forming a very thin layer of the hydro-carbon lubricating oil or wax between the lubricant containing thermoplastic material layer and the resin material layer precoated on the surface of the PC-steel, rod or wire.

c. The said coating may be similarly applied in double coating with the said plastic material, the PC-steel rod or wire precoated with the lubricant-containing thermo-plastic material.

The effects of the present invention will be explained as follows:

1. When the oleophobic thermoplastic material containing 3–15 wt% of the lubricant is used, it has been observed that the thickness of the lubricant layer automatically formed reaches to from a few microns to about 10 microns and that the said lubricant layer is maintained in that situation for long periods without being absorbed in the oleophobic thermoplastic material while being free from fear of deteriorating the steel material thereby obtaining a superior anti-corrosion property for the PC-steel and the effect of sliding between the PC-steel rod or wire and the said lubricant-containing oleophobic thermoplastic layer formed on the surface of the PC-steel even if the said lubricant layer reaches to only about 10 microns.

If the PC-steel precoated with the resin material is used according to the method of this invention, the anti-corrosion property may further increase since the PC-steel is coated with the inner layer of the resin material, the intermediate thin layer of the lubricant and the outer layer of the lubricant-containing oleophobic thermoplastic material in order, and also the effect of sliding is attained between the said resin material and the lubricant-containing thermoplastic material when the PC-steel rod or wire is stretched, since the elongation of the said resin material follows that of the PC-steel rod or wire and the very thin layer of the lubricant is formed between the layer of the said resin material and the layer of the lubricant-containing thermoplastic material.

2. When the oleophilic thermoplastic material is used, it has been observed that the thickness of the lubricant layer formed on the surface of the PC-steel reaches to less than 1/10 of the lubricant layer formed in case of using the oleophobic thermoplastic material, since a great portion of the said lubricant layer is absorbed into the layer of the oleophilic thermoplastic material coated on the surface of the PC-steel.

3. When the PC-steel rod or wire precoated with the lubricant containing thermoplastic material is further coated with the said plastic material, the very thin layer of the lubricant is formed between the PC-steel and the lubricant-containing thermo-plastic material, and the effect of sliding is attained between the PC-steel and the lubricant-containing thermoplastic material. The very thin layer of the lubricant is not formed between the said plastic material and the lubricant-containing thermoplastic material and strong adhesion is not obtained therebetween. The PC-steel rod or wire double coated with the lubricant-containing thermoplastic material and the said plastic material possesses a superior anticorrosion property and is suitable to use such PC-steel concrete structure in the sea.

As mentioned above, the main effects of this invention reside in the anti-corrosion property as well as in the sliding effect on the basis of the thin layer of the lubricant automatically formed during the coating process of the PC-steel according to the process of this invention.

The anti-corrosion property, one of the effects of this invention, has been proved by effecting the comparative test in which the growth of rust on the surface of the PC-steel is observed in the samples of the exoleated PC-steel and the PC-steel stripped off the coating of the lubricant-containing thermoplastic material after allowing it in the air for a week.

It has been observed from the test result that the growth of rust is greatly hindered in the said latter PC-steel than the said former PC-steel owing to the very thin hydrocarbon lubricating oil or wax formed on the surface of the latter PC-steel.

The sliding effect, another of the said effects, has been proved by the experiment explained later on.

EXAMPLE 1

Acetal copolymer powders sold under trade name "Celcon" by celanese corporation U.S.A. were used as the molding material of the oleophobic thermoplastic material to be coated on the surface of the PC-steel rod.

The acetal copolymer containing 3 wt% of SAE No. 30 engine oil manufactured according to the above mentioned method was fed to the extrusion molding machine, the heating cylinder of which has its feed, compression, metering and nozzle sections maintained at temperatures in 70°, 150°, 180° and 180°C respectively. The PC-steel rod of 6.5 mm diameters was fed to the cross-head die attached to the said molding machine at a predetermined speed of 10 m/min. whereby the surface of the PC-steel rod was coated with the layer of the lubricant containing polyacetal copolymer of 0.7 mm in thickness.

A very thin layer of the lubricant is automatically formed on the surface of the PC-steel rod during the plastic coating process mentioned above and it reaches to the thickness of 0.003 mm. The thin layer is formed by the extrusion conditions, i.e. the temperature of and pressure on the lubricant containing polyacetal copolymer, as it is extruded. Also, it has been observed that the fine discrete particles of the lubricant are uniformly dispersed in the coating layer of the acetal copolymer by means of the polarization microscope.

EXAMPLE 2

The method of the example 1 was repeated using the acetal copolymer containing 5 wt% of SAE No. 30 engine oil.

It has been observed from the weight calculation of the thin layer formed of the lubricant that it reaches to the thickness of 0.005 mm.

EXAMPLE 3

The method of the example 1 was repeated using an acetal copolymer containing 9 wt% of SAE No. 30 engine oil. The thin layer of the lubricant formed reaches to the thickness of 0.008 mm.

EXAMPLE 4

The method of the example 1 was repeated using the acetal coplymer powders "celcon" not containing any lubricant oil.

EXAMPLE 5

High density polyethylene pellets for example, trade name Alathon (Du pont de Nemours Co.), Alkathene (Imperial Chemical Industries Ltd.) and Hostalen (Farbwerke Hoechst A.G.) were used as the molding material of the oleophilic thermoplastic material to be coated on the surface of the PC-steel rod.

The lubricant-containing molding material was prepared by mixing the said polyethylene pellets with 3 wt% of SAE No. 30 engine oil and penetrating the lubricant into said pellets at the temperature of 100°C.

The molding material thus obtained was fed to the extrusion molding machine, the heating cylinder of which was maintained at the temperature of 210°C. The PC-steel rod of 6.5 mm diameter was fed to the cross-head die attached to the said molding machine at the speed of 10 m/min.

The coating layer of the lubricant containing oleophilic thermoplastic material reaches to 0.7 mm thickness. The thickness of the lubricant layer was impossible to measure.

EXAMPLE 6

The method of the example 5 was repeated using the polyethylene pellets containing 9 wt % of SAE No. 30 engine oil.

It has been observed from the weight calculation of the thin layer of the lubricant that it may reach the thickness of 0.0002 mm.

EXAMPLE 7

The method of the example 5 was repeated using the polyethylene pellets containing 15 wt% of SAE No. 30 engine oil.

It has been observed from the weight calculation of the thin layer of the lubricant that it may reach the thickness of 0.0003 mm.

EXAMPLE 8

The method of the example 5 was repeated using polyethylene pellets not containing any lubricant as the molding material.

The sliding test of the steel material of this invention was effected as follows:

The test pieces Nos. 1–8 were manufactured by cutting the PC-steel rod coated with the lubricant containing thermoplastic material manufactured according to the methods given in the examples 1–8 in the length of 200 mm, stripping the coating in the length of 50 mm at the both ends thereof and burying and solidifying in the concrete the unstripped portion coated with the said thermo-plastic material in the length of 100 mm.

Pulling test of the steel rods of the test pieces Nos. 1–8 was effected by the Amsler universal material testing machine.

The test results have been obtained as follows:

| | Test piece No. | Amount of the lubricant (wt%) | Static friction force (kg) | Kinetic friction force (kg) | Note |
|---|---|---|---|---|---|
| Acetal copolymer | 1 | 3 | 60 | 40 | * |
| | 2 | 5 | 60 | 40 | * |
| | 3 | 9 | 55 | 35 | * |
| | 4 | 0 | 800 | 540 | ** |
| Polyethylene | 5 | 3 | 115 | 90 | * |
| | 6 | 9 | 74 | 48 | * |
| | 7 | 15 | 53 | 32 | * |

-continued

| Test piece No. | Amount of the lubricant (wt%) | Static friction force (kg) | Kinetic friction force (kg) | Note |
|---|---|---|---|---|
| 8 | 0 | 744 | 390 | ** |

Note:
*Sliding occurs between the PC-steel and the coating layer of the lubricant containing thermoplastic material.
**Sliding occurs between the coating layer of the lubricant containing thermoplastic material and the concrete structure.

The static friction force means the maximum pulling force at the beginning of the sliding.

The kinetic friction force means the minimum pulling force during sliding.

From the test results of the said table, it has been found that the friction force between the PC-steel and the thermoplastic material not containing any lubricant is remarkably larger than that between the PC-steel and the lubricant-containing thermo-plastic material in the both cases of the oleophilic thermoplastic material and the oleophobic thermoplastic material.

It has been found that the values of the said friction force are not remarkably changed without having any influence on the amount of the lubricant contained in the oleophobic thermoplastic material such as the acetal polymer, but that the values of the said friction force are remarkably effected according to the amount of the lubricant in the olephilic thermoplastic material such as the high density polyethylene.

It has been concluded from the said test results that the said sliding occurs by the aid of the thin layer of the lubricant automatically formed on the surface of the PC-steel rod, and also that the thin layer of the lubricant useful for sliding is easy to form in the lubricant-containing oleophobic thermoplastic material, but the said thin layer is difficult to form in the lubricant-containing oleophilic thermoplastic material.

The friction force of the lubricant-containing oleophilic thermoplastic material reduces to that of the lubricant itself when the said thermoplastic material contains a considerable amount of lubricant.

In the thermoplastic material not containing any lubricant, the said sliding phenomena have not been observed between the PC-steel rod and the coating layer of the said thermoplastic material as shown in the samples Nos. 4 and 8, but observed between the concrete structure and the said thermoplastic material layer.

It has been concluded from the said phenomena that the adhesive force between the PC-steel and the layer of the thermoplastic material is larger than that between the said layer of the thermoplastic material and the concrete structure in the thermo-plastic material not containing any lubricant and that the lubricant layer lying between the PC-steel rod and the coating layer of the lubricant containing thermoplastic material contributes to sliding of each other.

From the said experiment, it has been proved that the adhesive force between the concrete structure and the lubricant containing thermoplastic material is larger than that between the PC-steel rod and the lubricant containing oleophobic and oleophilic thermoplastic material.

As the lubricant is dispersed through the said oleophilic thermo-plastic material as discrete particles and not dispersed in succession as shown in the oil-impregnated sintered article, many advantages have been observed in the points that oily matters adhered on the surface of the lubricant containing oleophobic thermoplastic material are able to be easily removed by a simple exoleated means thereby giving the firm adhesion between the lubricant-containing oleophobic thermoplastic material and the concrete structure and also that the lubricant dispersed in the lubricant-containing oleophobic thermoplastic material is not easily extracted by the said exoleated operation.

While in the oleophilic thermoplastic material such as polyethylene, as the polyethylene is soluble into oil or remarkably absorbs oil, there was a fear of not obtaining a sufficient adhesive force between the concrete structure and the coating layer of the lubricant-containing oleophilic thermoplastic material. But, it has been observed from the test results that the adhesive force between the said coating layer of the thermoplastic oleophilic material and the concrete structure is larger than the sliding force between the PC-steel and the said coating layer of the lubricant containing oleophilic thermoplastic material whereby the sliding occurs between the lubricant-containing oleophilic thermoplastic material and the PC-steel rod, without effecting any ordinary exoleolate working on the contact surface of the coating layer of the said lubricant-containing oleophilic thermoplastic material, but by effecting simple exoleolate treatment such as wiping.

The said test results) were obtained using polyethylene as the oleophilic thermoplastic material and polyacetal as the oleophobic thermoplastic material.

If polyvinylchloride is used as the oleophobic thermoplastic material, both the static and kinetic friction force were somewhat larger than those in the case of polyacetal, but the thin layer of the lubricant on the surface of the PC-steel was automatically formed in the same way as in the case of polyacetal. The test results obtained from the other polyolefin such as polypropylene were same to those of polyethylene.

One of the functional effects of this invention is proved in the post-tensioning process in which the PC-steel rod or wire coated with the lubricant-containing thermoplastic material is arranged within the molding frame and concrete is filled around the said steel wire or rod within the molding frame, and is allowed to set until obtaining the predetermined strength of the concrete structure and then the said steel rod or wire is stretched to fix the ends thereof, by the fact that the coating layer of the lubricant-containing thermoplastic material covered the PC-steel rod or wire is intimatly adhesive to the concrete structure so as to be useful to the sheath. The stretching force works on only the steel rod or wire, since the thin layer of the lubricant automatically formed between the said PC-steel rod or wire and the said lubricant-containing thermoplastic material allows sliding therebetween thereby smoothly effecting the stretching process. Another effect is accomplished in the grouting process in which the said PC-steel rod or wire coated with the lubricant-containing thermoplastic material is inserted within the sheath prearranged in the concrete structure and stretched, grouted, since the said PC-steel rod or wire of the present invention possesses less friction force and both the insertion and the stretching are smoothly effected.

In conclusion, the said PC-steel material of this invention is applied to the PC-steel rod or wire, and possesses a superior anticorrosion property as well as less friction coefficient between the said PC-steel and the sheath in the working within the sheath, and also fulfils a role of the sheath when the PC-steel coated with the lubricant-containing thermoplastic material is buried into the concrete structure, since the thin layer of the lubricant has been automatically formed between the said PC-steel rod or wire and the coating layer of the lubricant-containing thermoplastic material.

This invention resides in providing the PC-steel material coated with the lubricant-containing thermoplastic material so as to slide between the PC-steel (or the thermoplastic resin material) and the lubricant-containing thermoplastic material.

The manufacture of the PC-steel concrete structure becomes simple omitting the use of the sheath, by using the lubricant-containing thermoplastic material.

The PC-steel materials having good and constant quality are easily manufactured according to the process of this invention in the comparison with those of the prior art.

What is claimed is:

1. A steel material for use in a prestressed concrete structure, said material comprising a PC-steel wire or rod, a layer of a hydrocarbon lubricating oil or wax containing thermoplastic synthetic organic resin and a thin layer of a hydrocarbon lubricating oil or wax between the said PC-steel wire or rod and the layer of the said lubricant-containing thermoplastic synthetic organic resin.

2. A steel material as in claim 1 for use in a prestressed concrete structure wherein said thermoplastic synthetic organic resin is selected from the group consisting of polyamide and polyacetal.

3. A steel material as in claim 1 for use in a prestressed concrete structure wherein said thermoplastic synthetic organic resin is a polyolefin.

4. A steel material as in claim 1 for use in a prestressed concrete structure wherein said hydrocarbon lubricating oil or wax is present in 3–15% by weight of said resin layer.

5. A steel material for use in a prestressed concrete structure, said material comprising a PC-steel wire or rod an inner layer of a synthetic organic resin, an outer layer of a hydrocarbon lubricating oil or wax containing thermoplastic synthetic organic resin, and a thin layer of a hydrocarbon lubricating oil or wax between the said inner layer and the said outer layer.

6. A steel material as in claim 5 for use in a prestressed concrete structure wherein the outer layer of said hydrocarbon lubricating oil or wax containing thermo-plastic synthetic organic resin has a lower melting point than that of the said synthetic organic resin used as the said inner layer.

7. A steel material as in claim 5 for use in a prestressed concrete structure wherein the inner layer of the synthetic organic resin may be thermosetting and such resin is selected from the group consisting of olephobic thermo-plastic material and oleophobic thermosetting material.

8. A steel material as in claim 5 for use in a prestressed concrete structure wherein said hydrocarbon lubricating oil or wax is present in 3–15 percent by weight of said inner layer of said synthetic organic resin.

9. A steel material as in claim 5 for use in a prestressed concrete structure wherein said thermoplastic synthetic organic resin is selected from the group consisting of polyamide and polyacetal.

10. A steel material for use in a prestressed concrete structure, said material comprising PC-steel wire or rod, an inner layer of hydrocarbon lubricating oil or wax containing thermoplastic synthetic organic resin, an outer layer of a synthetic organic resin, and a thin layer of a hydrocarbon lubricating oil or wax between the PC-steel wire or rod and the said inner layer.

11. A steel material as in claim 10 for use in a prestressed concrete structure wherein the outer layer of the synthetic organic resin is selected from the group consisting of olephobic thermo-plastic material and oleophobic thermosetting material.

12. A steel material as in claim 10 for use in a prestressed concrete structure wherein the outer layer of the synthetic organic resin is selected from the synthetic organic resins having a lower melting point than that of the hydrocarbon lubricating oil or wax containing thermoplastic synthetic organic resin used as the said inner layer.

13. A steel material as in claim 10 for use in a prestressed concrete structure wherein said hydrocarbon lubricating oil or wax is present in 3–15 percent by weight of said outer layer of said synthetic organic resin.

14. A steel material as in claim 10 for use in a prestressed concrete structure wherein said thermoplastic synthetic organic resin is selected from the group consisting of polyamide and polyacetal.

15. A method of making steel material for use in a prestressed concrete structure, said method comprising the steps of feeding a hydrocarbon lubricating oil or wax containing thermoplastic synthetic organic resin pellets to an extrusion molding machine, the heating cylinder of which having its feed, compression, metering and nozzle sections maintained at controlled temperatures, feeding a PC-steel wire or rod to a die attached to the said extrusion molding machine at a predetermined speed, whereby the surface of the PC-steel wire or rod is coated with a layer of said hydrocarbon lubricating oil or wax containing thermoplastic synthetic organic resin and automatically forming a thin layer of a hydrocarbon lubricating oil or wax between the said PC-steel wire or rod and the layer of the said hydrocarbon lubricating oil or wax containing thermoplastic synthetic organic resin by the heated coating action.

16. A method as in claim 15 wherein the thermoplastic synthetic organic resin pellets, pre-mixed with 3–15 wt% of said hydrocarbon lubricating oil or wax is fed to the extrusion molding machine.

17. A method of making steel material for use in a prestressed concrete structure which comprises applying to a PC-steel wire or rod, coated with an inner layer of a synthetic organic resin, an outer layer of a thermoplastic synthetic organic resin containing a hydrocarbon lubricating oil or wax having a melting point lower than that of the synthetic organic resin of the said inner layer.

18. A method of making steel material for use in a prestressed concrete structure which comprises applying to a PC-steel wire or rod, coated with an inner layer of a hydrocarbon lubricating oil or wax containing thermo-plastic synthetic organic resin, an outer layer of a synthetic organic resin having a melting point lower than that of the thermoplastic synthetic organic resin used as the said inner layer.

19. A method for making steel material for use in a prestressed concrete structure, said method comprising the steps of feeding a hydrocarbon lubricating oil or wax containing thermoplastic synthetic organic resin pellets to an extrusion molding machine, the heating cylinder of which having its feed, compression, metering and nozzle sections maintained at controlled temperatures, feeding a PC-steel wire or rod to a die on said extrusion molding machine to coat the surface of the PC-steel wire or rod with a layer of said hydrocarbon lubricating oil or wax containing thermoplastic synthetic organic resin, and forming a thin layer of a hydrocarbon lubricating oil or wax between the said PC-steel wire or rod and the layer of the said hydrocarbon lubricating oil or wax containing thermoplastic synthetic organic resin by the extrusion conditions, said synthetic resin being selected from the group consisting of polyacetal, polyamide, polyvinyl chloride, polyvinylidene chloride, polyvinylacetate, polyacrylonitrile and copolymers thereof.

20. A steel material for use in a prestressed concrete structure, said material comprising a layer of a hydrocarbon lubricating oil or wax containing thermoplastic synthetic organic resin on a PC-steel wire or rod, and a thin layer of only a hydrocarbon lubricating oil between the said PC-steel wire or rod and the layer of the said hydrocarbon lubricating oil or wax containing thermoplastic synthetic organic resin, the said thermoplastic synthetic organic resin being selected from the group consisting of polyolefins, polyamides and polyacetals, and the hydrocarbon lubricating oil is present in 3–15 percent by weight of said resin.

* * * * *